United States Patent
Gerrits et al.

(10) Patent No.: US 7,236,509 B2
(45) Date of Patent: Jun. 26, 2007

(54) METHOD OF COMMUNICATING INFORMATION BETWEEN A TRANSMITTER AND A RECEIVER USING ULTRAWIDEBAND SIGNALS

(75) Inventors: John Gerrits, Cortaillod (CH); Alexandre Pollini, Yverdon (CH); John Farserotu, Auvernier (CH)

(73) Assignee: CSEM Centre Suisse d'Electronique et de Microtechnique SA- Recherche et Developpement, Neuchatel (CH)

( * ) Notice: Subject to any disclaimer, the term of this patent is extended or adjusted under 35 U.S.C. 154(b) by 739 days.

(21) Appl. No.: 10/625,731

(22) Filed: Jul. 24, 2003

(65) Prior Publication Data

US 2004/0146114 A1 Jul. 29, 2004

(30) Foreign Application Priority Data

Jul. 26, 2002 (FR) .................................. 02 09513

(51) Int. Cl.
 *H04B 1/69* (2006.01)
(52) U.S. Cl. ..................................... 375/130
(58) Field of Classification Search ................ 375/130, 375/259
 See application file for complete search history.

(56) References Cited

U.S. PATENT DOCUMENTS

| | | | |
|---|---|---|---|
| 6,717,992 B2* | 4/2004 | Cowie et al. ................. | 375/316 |
| 6,810,087 B2 | 10/2004 | Hoctor et al. | |
| 2001/0053175 A1 | 12/2001 | Hoctor et al. ................. | 375/130 |
| 2004/0190596 A1* | 9/2004 | Lehmann et al. ........... | 375/138 |
| 2004/0202230 A1* | 10/2004 | Dowla et al. ................ | 375/147 |

FOREIGN PATENT DOCUMENTS

| | | |
|---|---|---|
| WO | 01/43386 | 6/2001 |
| WO | WO 01/43386 | 6/2001 |
| WO | 01/93443 | 12/2001 |

OTHER PUBLICATIONS

"Multistage Frequency-Hopping Assisted Ultra-Widebank Multiple-Access Communications", IEEE, Yang et al, Apr. 28, 2002, pp. 748-752.
"Behaviour of Ultrawideband-Radar Array Antennas", Mokole et al, IEEE, Oct. 15, 1996, pp. 113-118.
"Ultra-Wideband for Navigation and Communications", Adams et al, Mar. 20, 2001, pp. 2-785-2-791.
Evaluation of an Ultra-Wide-Band Propagation Channel, Cramer et al, IEEE Transactions on Antennas and Propagation, vol. 50, May 2002, pp. 561-570.

* cited by examiner

*Primary Examiner*—Don N. Vo
(74) *Attorney, Agent, or Firm*—Jacobson Holman PLLC

(57) ABSTRACT

Useful information taking the form of an analog or digital voltage is communicated between a transmitter and a receiver using UWB signals. The transmitter includes a subcarrier modulator, a high frequency oscillator and a transmission antenna and the receiver includes a reception antenna and an amplifier and a demodulator for discriminating the useful information in a signal received at the reception antenna. On transmission, the method generates a narrow frequency band high frequency carrier, modulates the high frequency carrier using a subcarrier with a modulation index at least equal to 10, and modulates the subcarrier using the useful information. On reception, the method demodulates the carrier to extract therefrom the subcarrier and demodulates the subcarrier to extract therefrom the useful information.

9 Claims, 1 Drawing Sheet

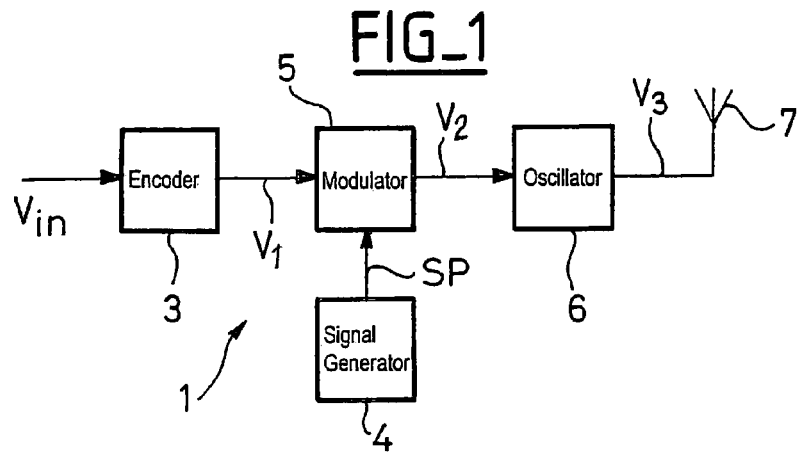
FIG_1
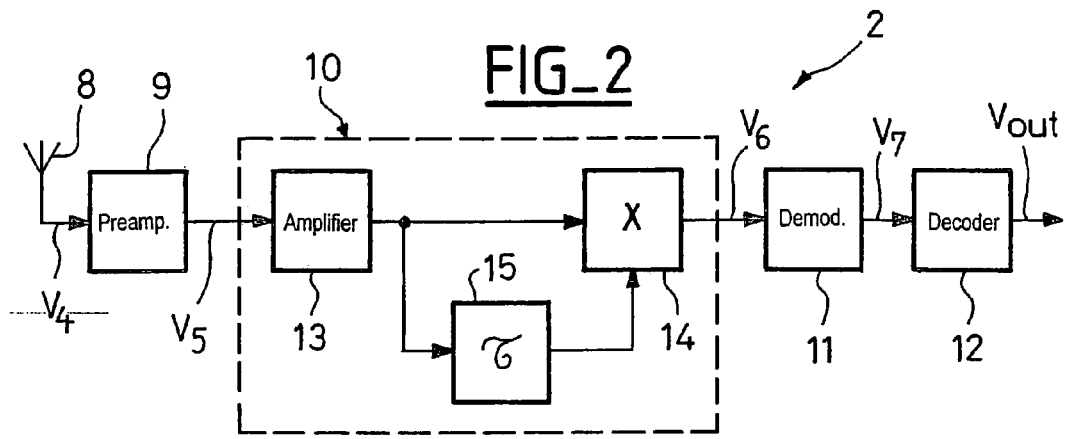
FIG_2
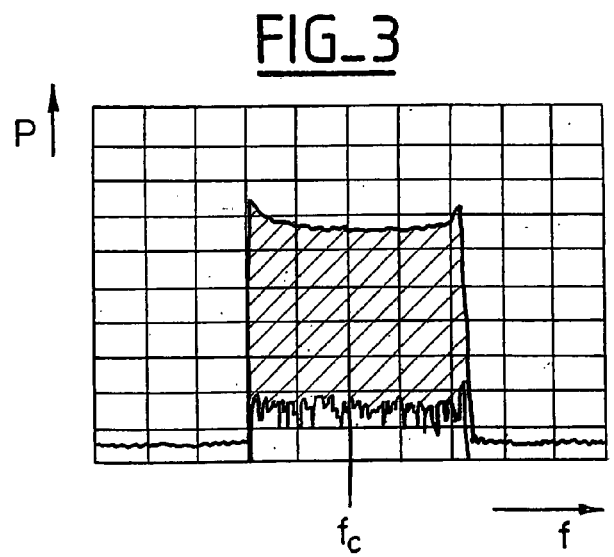
FIG_3

METHOD OF COMMUNICATING INFORMATION BETWEEN A TRANSMITTER AND A RECEIVER USING ULTRAWIDEBAND SIGNALS

BACKGROUND OF THE INVENTION

1. Field of the Invention

The present invention relates to a method of establishing communications using ultrawideband (UWB) signals.

2. Description of the Prior Art

Wavelet signals are used in the communication art to transmit digital information using modulation, for example pulse position modulation (PPM) or ON-OFF keying (OOK) of the wavelet signals.

Because the energy spectrum of wavelet signals is spread over a very wide frequency band, the global energy level can, all other performance factors being equal, be relatively low, with the result that using wavelet signals makes it easier to conform to the regulations governing telecommunications. Moreover, communication using wavelet signals is relatively insensitive to interference and to reflections, and therefore can be used with advantage in confined environments in which other narrow frequency band high power communications are already present. As a general rule, a UWB signal has a bandwidth BRF such that, at a center frequency $f_c$:

$$B_{RF} \geq \frac{f_c}{4}$$

Several methods of generating UWB wavelet signals are known in the art. They employ either short Gaussian pulses or bursts or scanning of sinusoidal signals obtained by radio techniques or fast switching (fast on-off keying) techniques.

However, as the duty factor of wavelet signals used for digital communications is relatively low, the prior art methods cited above have the drawback of necessitating synchronization between the transmitter and the receiver, to make the active window of the receiver coincide with wavelets sent by the transmitter. This kind of synchronization requires relatively complex circuits. Moreover, the circuits necessary for generating the wavelets are also relatively complicated.

An object of the invention is to provide a method of establishing ultrawideband communications for transmitting digital information that necessitates only simple circuits that are available off the shelf and dispenses with synchronization between transmission and reception.

SUMMARY OF THE INVENTION

The invention therefore provides a method communicating useful information taking the form of an analog or digital voltage between at least one transmitter and at least one receiver using UWB signals, said at least one transmitter including a subcarrier modulator, a high frequency oscillator and a transmission antenna, and said at least one receiver including a reception antenna and amplification and demodulation means for discriminating said useful information in a signal received at said reception antenna, which method consists in:

on transmission, generating a narrow frequency band high frequency carrier, modulating said high frequency carrier using a subcarrier with a modulation index at least equal to 10, and modulating said subcarrier using said useful information, and on reception, demodulating said carrier to extract therefrom said subcarrier and demodulating said subcarrier to extract therefrom said useful information.

Thanks to the above features, the received information is extracted from the transmitted signal by double demodulation, and so synchronization between the transmitter and the receiver can be dispensed with. Moreover, the transmitter and the receiver can be constructed from components that are available off the shelf, which minimizes their cost. It will also be noted that there is no need for a local oscillator for the reception.

According to other beneficial features of the invention:

said subcarrier takes a sinusoidal, sawtooth or triangular form;

said subcarrier has a specific frequency for at least one transmitter/receiver pair;

the frequency of said subcarrier is higher than the spectral bandwidth of said useful information;

said useful information is generated from information in analog or digital form and possibly encoded;

said carrier is demodulated on reception using a delay line;

said delay line produces a time-delay τ according to the following equation:

$$\tau = \frac{N}{4f_c}$$

in which N=1, 3, 5, etc; and $f_c$ is the center frequency of the UWB signal;

said delay line is made in a circuit taking the form of a surface or bulk acoustic wave line;

said delay line is made with the aid of a coaxial cable.

Other features and advantages of the present invention will become apparent in the course of the following description, which is given by way of example only and with reference to the accompanying drawing.

BRIEF DESCRIPTION OF THE DRAWING

FIG. 1 is a block diagram of a transmitter for implementing the method according to the invention.

FIG. 2 is a block diagram of a receiver adapted to cooperate with the transmitter shown in FIG. 1.

FIG. 3 shows the spectrum of a signal that can be passed between the transmitter and the receiver shown in FIGS. 1 and 2, respectively.

DETAILED DESCRIPTION OF THE PREFERRED EMBODIMENT

The transmitter 1 shown in FIG. 1 receives a signal $V_{in}$ whose content is to be transmitted to a receiver 2 like that shown in FIG. 2. The signal $V_{in}$ can be an analog signal or a digital signal. It is fed to an encoding or encryption circuit 3 which produces from it a digital signal $V_1$.

The transmitter 1 further includes a subcarrier generator 4 which generates a subcarrier signal SP whose frequency is higher than the bandwidth of the signal $V_1$.

The signal V1 and the subcarrier signal SP are fed to a subcarrier modulator 5 which can be a frequency modulator or an amplitude modulator. If frequency modulation is chosen, the subcarrier generator 4 can take the form of an analog voltage-controlled oscillator (VCO) or a numerically controlled oscillator (NCO). In the latter case, a microprocessor associated with appropriate software can be used. It will further be noted that the subcarrier SP can take various forms, the preferred forms being sinusoidal, sawtooth and triangular.

The transmitter 1 further includes a high frequency oscillator 6 to which the modulator signal $V_2$ from the modulator 5 is fed. The signal generated by this high frequency oscillator is used as the carrier for communications between the transmitter 1 and the receiver 2. The signal $V_2$ frequency modulates this carrier so that the instantaneous output frequency of the transmitter 1 is proportional to the signal $V_2$ that is fed to the oscillator 6. Furthermore, the frequency modulation must be carried out with a modulation index at least equal to 10. The oscillator 6 can equally well be a voltage controlled oscillator (VCO). The output signal $V_3$ of the oscillator 6 includes a UWB signal with a content which reflects that of the signal $V_{in}$ applied to the input of the transmitter 1. The output signal $V_3$ is sent to a transmission antenna 7.

The frequency of the subcarrier SP can be chosen specifically for a given transmitter/receiver pair or for a group of such transmitter/receiver pairs so that communication is confidential to the pair or group.

The communication is received by a reception antenna 8 of the receiver 2, which is connected to a preamplifier 9 to which the received signal $V_4$ is fed to increase its level before demodulation. The preamplifier 9 can include filter means for rejecting any signal component caused for example by interference received at the antenna 8 outside the concerned frequency band. A wideband FM demodulator 10 is connected to the output of the preamplifier 9, from which it receives the signal $V_5$, from which it extracts the baseband signal or subcarrier $V_6$. The output of the demodulator 10 is connected to a subcarrier demodulator 11 which extracts from the demodulated subcarrier the encoded or encrypted signal $V_7$. The content of the latter corresponds to the signal $V_1$ processed in the transmitter 1. The signal $V_7$ is then decoded or decrypted in a decoder 12 supplying an output signal $V_{out}$ corresponding to the original signal $V_{in}$ applied to the input of the transmitter 1.

The demodulator 10 preferably takes the form of a delay line demodulator. A limiter amplifier 13 connected to the output of the preamplifier 9 is adapted to eliminate any amplitude modulation component in the signal $V_5$. The output of the limiter amplifier 13 is fed to a multiplier 14 and to a delay line 15 for introducing a time-delay $\tau$. The time-delay is preferably chosen so that:

$$\tau = \frac{N}{4f_c}$$

in which N=1, 3, 5, etc. and $f_c$ is the center frequency of the UWB signal carrier.

$$B_{RF} = \frac{2f_c}{N}$$

is the useful output of the demodulator 10. For example, if N=3, the bandwidth is $0.67 \times f_c$.

The delay line 15 can be formed by a surface or bulk acoustic wave line, which can be integrated into the same circuit as the circuitry of the receiver 2. A simple coaxial cable or a microstrip line can also provide a delay line.

FIG. 3 shows by way of example the frequency spectrum obtained with the method of the invention, using a center frequency of 69 MHz and a high frequency power of 1 mW. The spectrum features a FM spectral band spreading including a multitude of low-energy spectral components. The bandwidth of the UWB signal is equal to 20 MHz in this example. In one example of implementing the method according to the invention, the following components, all of which are available off the shelf, can be used:

| | |
|---|---|
| Modulator 5 | CD 4046 |
| Oscillator 6 | Minicircuits Pos 60 |
| Subcarrier demodulator 10 | PLL 4046 |
| Multiplier 14 | MC 1496 |

There is claimed:

1. A method of communicating useful information taking the form of an analog or digital voltage between at least one transmitter and at least one receiver using UWB signals, said at least one transmitter including a subcarrier modulator, a high frequency oscillator and a transmission antenna, and said at least one receiver including a reception antenna and amplification and demodulation means for discriminating said useful information in a signal received at said reception antenna, which method consists in:

on transmission, generating a narrow frequency band high frequency carrier, modulating said high frequency carrier using a subcarrier with a modulation index at least equal to 10, and modulating said subcarrier using said useful information, and on reception, demodulating said carrier to extract therefrom said subcarrier and demodulating said subcarrier to extract therefrom said useful information.

2. The method claimed in claim 1 wherein said subcarrier takes a sinusoidal, sawtooth or triangular form.

3. The method claimed in claim 1 wherein said subcarrier has a specific frequency for at least one transmitter/receiver pair.

4. The method claimed in claim 1 wherein the frequency of said subcarrier is higher than the spectral bandwidth of said useful information.

5. The method claimed in claim 1 wherein said useful information is generated from information in analog or digital form and possibly encoded.

6. The method claimed in claim 1 wherein said carrier is demodulated on reception using a delay line.

7. The method claimed in claim 6 wherein said delay line produces a time-delay $\tau$ according to the following equation:

$$\tau = \frac{N}{4f_c}$$

in which N is an odd integer and $f_c$ is the center frequency of the UWB signal.

8. The method claimed in claim 7, wherein said delay line is made in a circuit taking the form of a surface or bulk acoustic wave line.

9. The method claimed in claim 7 wherein said delay line is made with the aid of a coaxial cable.

* * * * *